(12) United States Patent
Lin et al.

(10) Patent No.: US 11,775,107 B1
(45) Date of Patent: Oct. 3, 2023

(54) TOUCH SENSOR AND MANUFACTURING METHOD THEREOF

(71) Applicant: TPK Advanced Solutions Inc., Fujian (CN)

(72) Inventors: Chia Jui Lin, Taoyuan County (TW); Shao Jie Liu, Xiamen (CN); Jian Zhang, Xiamen (CN); Si Qiang Xu, Xiamen (CN); Jun Hua Huang, Fujian Province (CN); Mei Fen Bai, Quanzhou (CN); Song Xin Wang, Xiamen (CN); Long Yun Zhan, Jilin (CN); Bo Huang, Fuzhou (CN)

(73) Assignee: TPK ADVANCED SOLUTIONS INC., Fujian (CN)

( * ) Notice: Subject to any disclaimer, the term of this patent is extended or adjusted under 35 U.S.C. 154(b) by 0 days.

(21) Appl. No.: 17/981,613

(22) Filed: Nov. 7, 2022

(51) Int. Cl.
*G06F 3/041* (2006.01)

(52) U.S. Cl.
CPC ........ *G06F 3/04164* (2019.05); *G06F 3/0412* (2013.01); *G06F 2203/04103* (2013.01)

(58) Field of Classification Search
None
See application file for complete search history.

(56) References Cited

U.S. PATENT DOCUMENTS 11,609,672 B1 * 3/2023 Li .................. G06F 3/0446

* cited by examiner

*Primary Examiner* — Brian M Butcher
(74) *Attorney, Agent, or Firm* — Cooper Legal Group, LLC

(57) ABSTRACT

A touch sensor having a visible area and a peripheral area includes a substrate, a metal nanowire layer, and a silver layer. The metal nanowire layer is disposed on a main surface of the substrate and defines a plurality of electrode portions corresponding to the visible area and a plurality of wiring portions corresponding to the peripheral area. The electrode portions are arranged at intervals, and the wiring portions are respectively connected to the electrode portions and arranged at intervals. Two adjacent electrode portions are spaced apart by a first spacer region, and two adjacent wiring portions are spaced apart by a second spacer region. The silver layer is disposed on the wiring portions and in contact with the wiring portions. A thickness of the substrate corresponding to the first spacer region is smaller than a thickness of the substrate corresponding to the second spacer region.

14 Claims, 12 Drawing Sheets

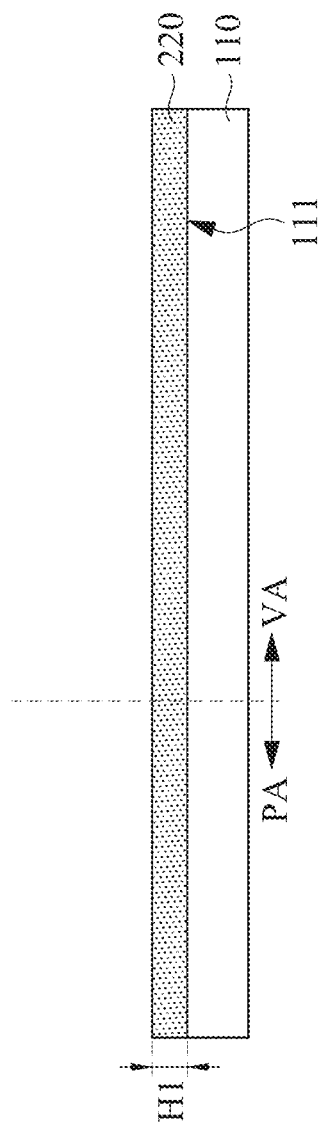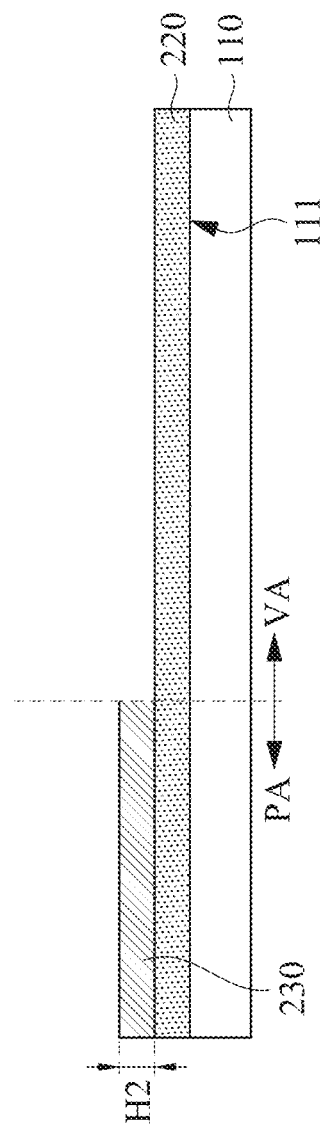
Fig. 4A
Fig. 4B

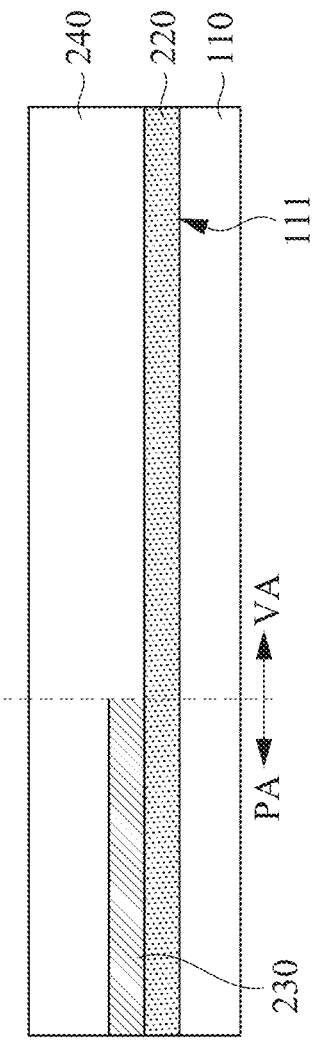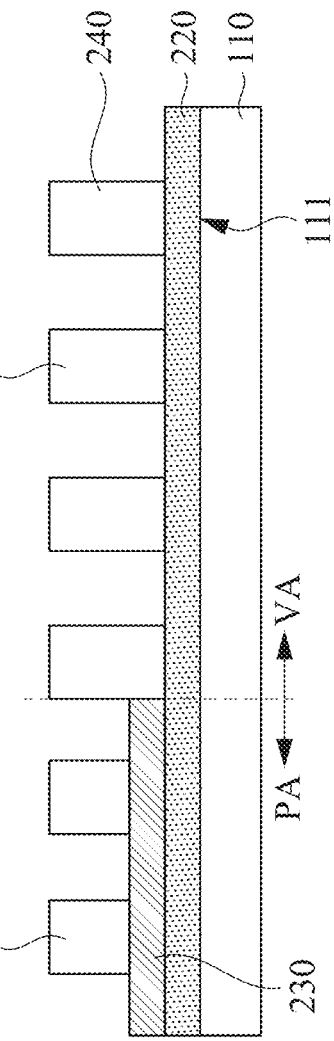

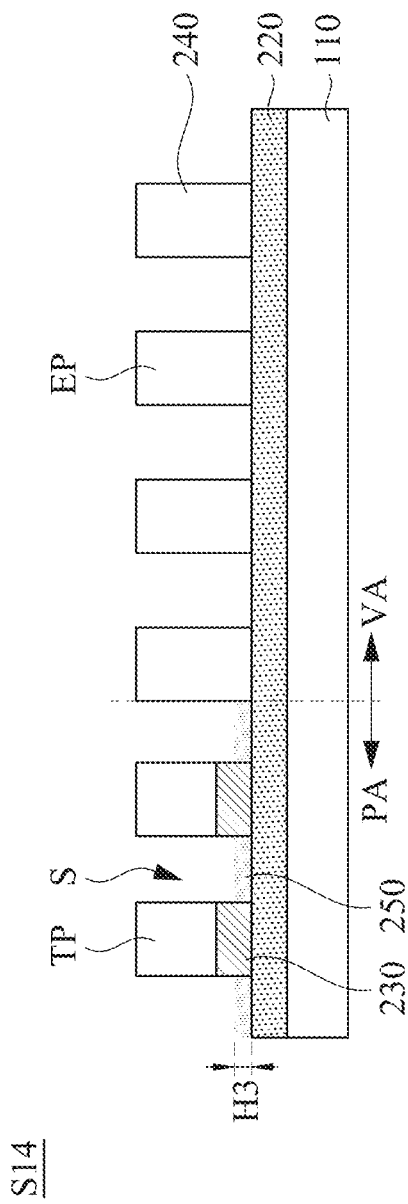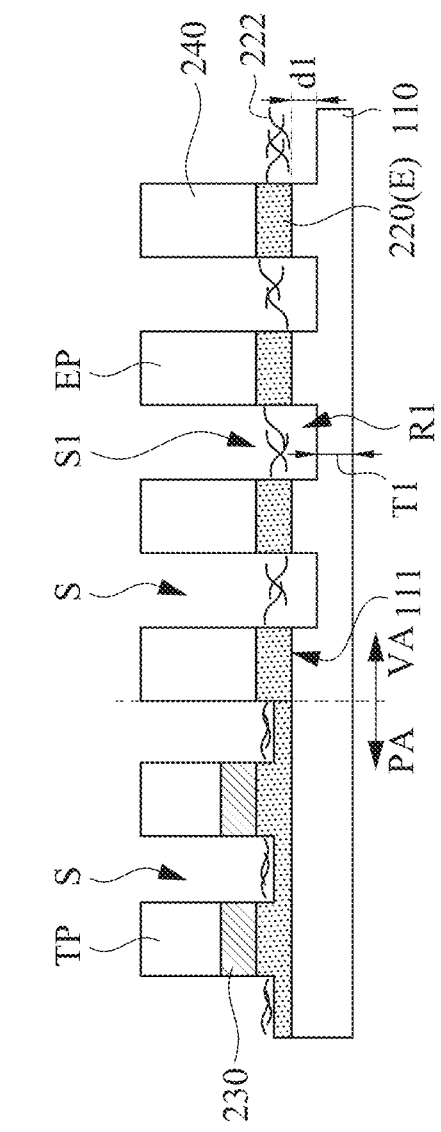

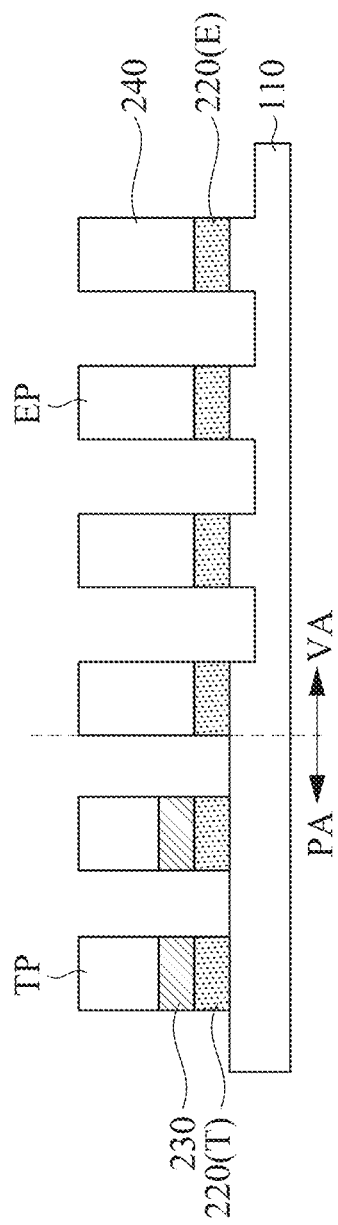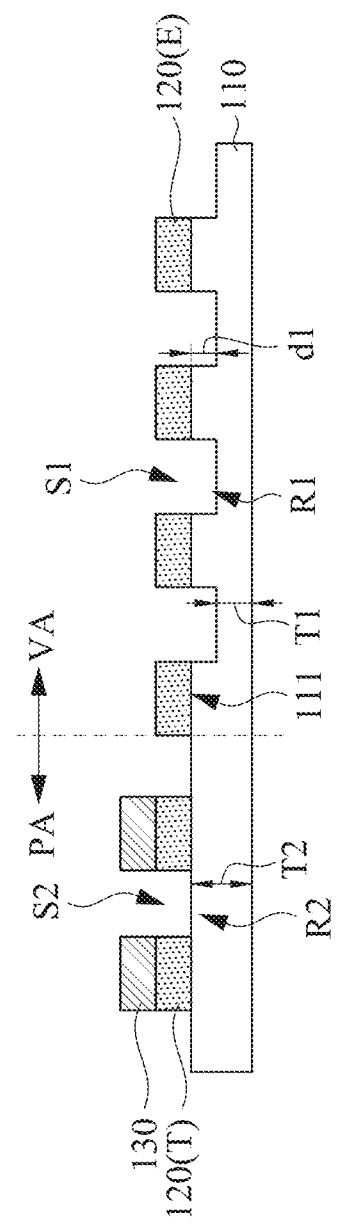

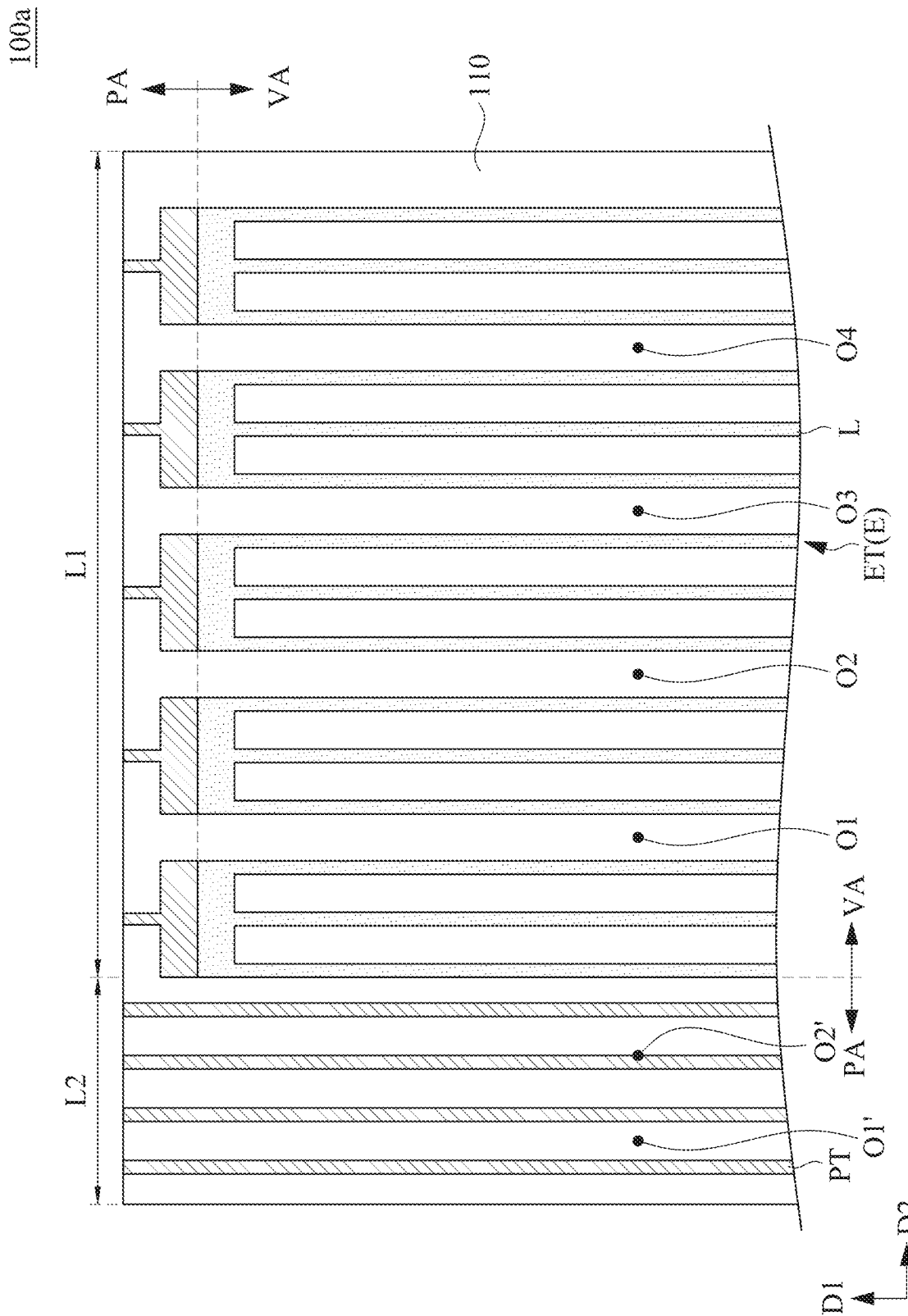

TOUCH SENSOR AND MANUFACTURING METHOD THEREOF

BACKGROUND

Field of Disclosure

The present disclosure relates to a touch sensor and a manufacturing method of a touch sensor.

Description of Related Art

In recent years, touch sensors have been widely used in portable electronic products such as mobile phones, notebook computers, satellite navigation systems, and digital audio-visual players to serve as information communication channels between users and electronic devices.

As demand for narrow bezel electronic products gradually increases, the industry is committed to improving the bendability of the electronic products and reducing the size of the bezel of electronic products to meet the needs of users. Generally, a touch sensor includes touch electrodes located in the visible area and peripheral circuits located in the peripheral area, and based on the bending requirements of the touch panel, silver paste is currently preferably used as the material for the peripheral circuits. For the silver paste material, it is common to form a silver layer from the silver paste material by performing a printing process, and to form the peripheral circuits in the peripheral area by patterning the silver layer. Also, the peripheral circuits designed in the peripheral area will affect the application of the touch panel to narrow-bezel products. Therefore, based on the use of silver paste as the material of the peripheral circuits, how to provide a touch sensor that can meet the requirements of flexibility and narrow bezel design without affecting the overall optical effect is currently worth studying.

SUMMARY

According to some embodiments of the present disclosure, a touch sensor having a visible area and a peripheral area adjacent to at least one side of the visible area includes a substrate, a metal nanowire layer, and a silver layer. The metal nanowire layer is disposed on a main surface of the substrate. The metal nanowire layer defines a plurality of electrode portions corresponding to the visible area and a plurality of wiring portions corresponding to the peripheral area. The electrode portions are arranged at intervals, and the wiring portions are respectively connected to the electrode portions and arranged at intervals. Two adjacent electrode portions of the electrode portions are spaced apart by a first spacer region, and two adjacent wiring portions of the wiring portions are spaced apart by a second spacer region. The silver layer is disposed on the wiring portions and are in contact with the wiring portions. A thickness of the substrate that corresponds to the first spacer region is smaller than a thickness of the substrate that corresponds to the second spacer region.

In some embodiments of the present disclosure, the substrate has a first surface recess corresponding to the first spacer region and a second surface recess corresponding to the second spacer region, and a depth of the first surface recess is greater than or equal to 30 nm and less than or equal to 200 nm.

In some embodiments of the present disclosure, the substrate has a first surface recess corresponding to the first spacer region, a depth of the first surface recess is greater than or equal to 30 nm and less than or equal to 200 nm, and the main surface of the substrate that corresponds to the peripheral area is substantially flat.

In some embodiments of the present disclosure, the substrate includes a base layer and a functional coating layer disposed on the base layer, and a bottom surface for defining a bottom boundary of the first surface recess is a surface of the base layer.

In some embodiments of the present disclosure, the substrate includes a base layer and a functional coating layer disposed on the base layer, and a bottom surface for defining a bottom boundary of the first surface recess is a surface of the functional coating layer.

In some embodiments of the present disclosure, the silver layer is in contact with an upper surface of the wiring portions to form a plurality of peripheral traces of the touch sensor.

In some embodiments of the present disclosure, a line width of each of the peripheral traces is greater than or equal to 6 µm and less than or equal to 10 µm, and a line spacing of two adjacent peripheral traces of the peripheral traces is greater than or equal to 6 µm and less than or equal to 10 µm.

In some embodiments of the present disclosure, the metal nanowire layer includes a matrix and a plurality of metal nanowires distributed in the matrix.

According to some other embodiments of the present disclosure, a manufacturing method of a touch sensor having a visible area and a peripheral area adjacent to at least one side of the visible area includes: forming a metal nanowire material layer on a main surface of a substrate, in which the metal nanowire material layer corresponds to the visible area and the peripheral area; screen printing a silver material layer on the metal nanowire material layer and corresponding to the peripheral area; forming a photoresist layer to cover the metal nanowire material layer and the silver material layer; performing an exposure and development process to pattern the photoresist layer, in which the photoresist layer, which is patterned, defines an electrode pattern corresponding to the visible area and defines a wiring pattern corresponding to the peripheral area; performing a first etching process to pattern the silver material layer through the wiring pattern; performing an argon plasma treatment process to remove a residual resin corresponding to the peripheral area through the wiring pattern, in which the residual resin is left by the silver material layer that has undergone the first etching process, and to remove at least a portion of the metal nanowire material layer and a portion of the substrate corresponding to the visible area through the electrode pattern such that a first surface recess is formed on the substrate; performing a second etching process to pattern the metal nanowire material layer through the wiring pattern and the electrode pattern; and removing the photoresist layer.

In some embodiments of the present disclosure, the manufacturing method of the touch sensor further includes: performing a chemical cleaning process after the first etching process and before the argon plasma treatment process, wherein the chemical cleaning process removes a portion of the residual resin corresponding to the peripheral area through the wiring pattern, and the residual resin is left by the silver material layer that has undergone the first etching process.

In some embodiments of the present disclosure, the metal nanowire material layer includes a matrix and a plurality of metal nanowires distributed in the matrix.

In some embodiments of the present disclosure, the argon plasma treatment process removes the matrix of the metal nanowire material layer.

In some embodiments of the present disclosure, the argon plasma treatment process further includes: removing at least a portion of the matrix of the metal nanowire material layer corresponding to the peripheral area through the wiring pattern.

In some embodiments of the present disclosure, the argon plasma treatment process further includes: removing a portion of the substrate corresponding to the peripheral area through the wiring pattern, such that a second surface recess is formed on the substrate.

According to the aforementioned embodiments of the present disclosure, the design of the touch sensor of the present disclosure helps to form the peripheral traces with small line width and line spacing without degrading the optical effect of the touch sensor. In addition, by integrally forming the electrode portion and the wiring portion to directly form an electrical connection between the touch electrode and the peripheral trace, there is no need to design an additional overlapping structure for the touch sensor. Hence, an area occupied by the overlapping structure corresponding to the peripheral area can be saved, and the overlapping tolerance will not be generated, which is beneficial to realize the narrow bezel design of the touch sensor. Furthermore, based on the stacked-structure design of the touch sensor of the present disclosure, during the manufacturing process of the touch sensor, the touch electrode and the peripheral trace can be formed at once through a single exposure and development process (i.e., only a single mask (photoresist) is used), and the argon plasma treatment process is performed in combination to remove the residual resin left by the silver material layer after the etching process, thereby reducing the steps and costs of the manufacturing process and improving the etching precision to form the peripheral traces with small line width and line spacing.

BRIEF DESCRIPTION OF THE DRAWINGS

The disclosure can be more fully understood by reading the following detailed description of the embodiments, with reference made to the accompanying drawings as follows:

FIG. 4A to FIG. 4H are schematic cross-sectional views illustrating a manufacturing method of the touch sensor of FIG. 1B in different steps;

FIG. 8 is a schematic diagram illustrating the measurement of the depths of the first and second surface recesses according to some embodiments of the present disclosure.

DETAILED DESCRIPTION

Figure 1A:
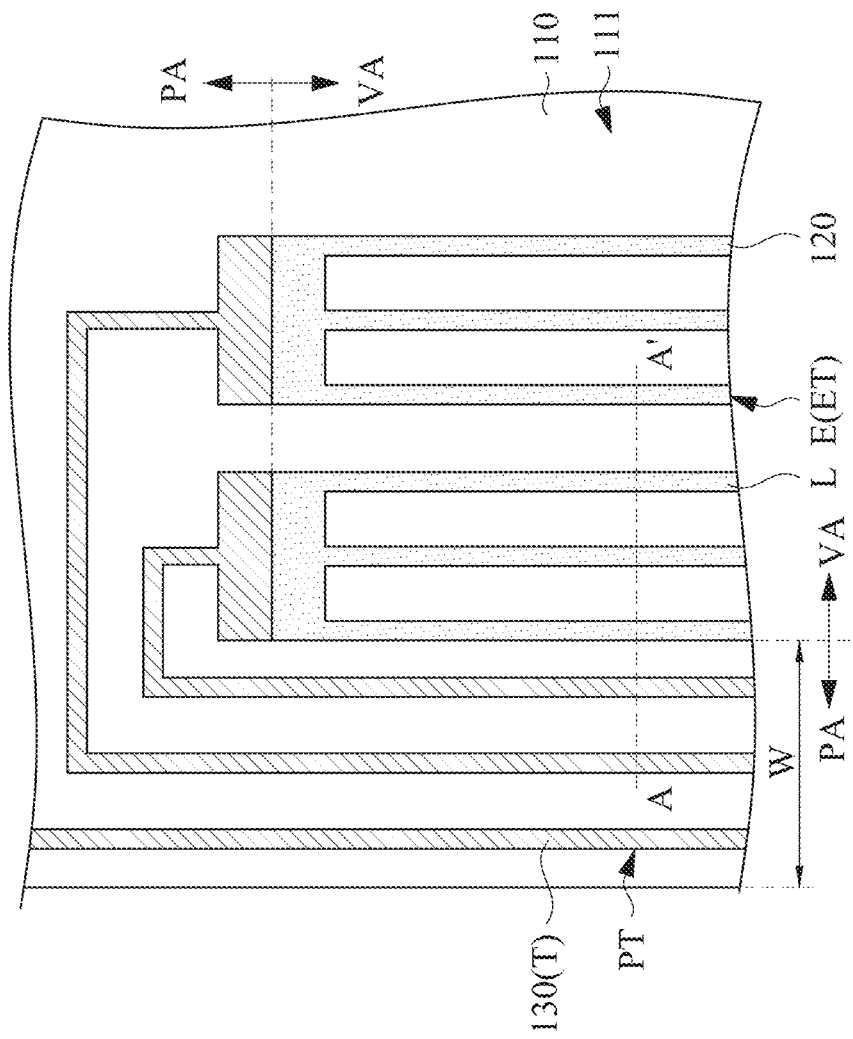
FIG. 1A is a schematic partial top view illustrating a touch sensor according to some embodiments of the present disclosure.

Reference will now be made in detail to the present embodiments of the disclosure, examples of which are illustrated in the accompanying drawings. However, it should be understood that these details should not be intend to limit the present disclosure. In addition, for the convenience of readers, the size of each element in the drawings is not illustrated according to actual scale. It should be understood that relative terms such as "lower" or "bottom" and "upper" or "top" can be used herein to describe the relationship between one element and another element, as shown in the figures. It should be understood that relative terms are intended to include different orientations of the device other than those shown in the figures.

Figure 1B:
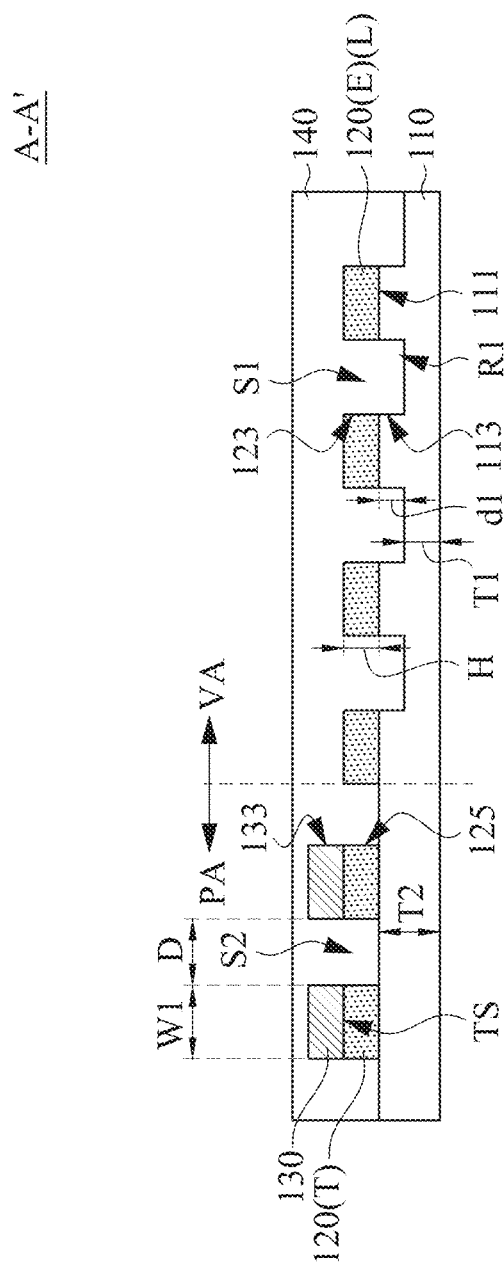
FIG. 1B is a schematic cross-sectional view illustrating the touch sensor in FIG. 1A taken along the line A-A'.

Reference is made to FIG. 1A and FIG. 1B, in which FIG. 1A is a schematic partial top view illustrating a touch sensor 100 according to some embodiments of the present disclosure, and FIG. 1B is a schematic cross-sectional view illustrating the touch sensor in FIG. 1A taken along the line A-A'. The touch sensor 100 includes a substrate 110, a metal nanowire layer 120, and a silver layer 130. In some embodiments, the touch sensor 100 has a visible area VA and a peripheral area PA, and the peripheral area PA is disposed on the sides of the visible area VA. For example, the peripheral area PA may be a frame-shaped area disposed around (i.e., including the right, left, upper, and lower sides of) the visible area VA. The substrate 110 has a main surface 111 configured to carry the metal nanowire layer 120 and the silver layer 130. In some embodiments, the substrate 110 may be a single substrate (also referred to as a base layer) such as a flexible transparent base layer, and a material of the substrate 110 may include, but is not limited to, transparent materials such as acrylic, polyvinyl chloride, polystyrene, polycarbonate, cycloolefin polymer, cycloolefin copolymer, polyethylene terephthalate, polyethylene naphthalate, colorless polyimide, or combinations thereof. In some other embodiments, the substrate 110 may include the single substrate (the base layer) mentioned above and at least one functional coating layer (e.g., a hard coating layer) disposed on the base layer. In other words, the main surface 111 of the substrate 110 may be an upper surface of the base layer or an upper surface of the functional coating layer.

The metal nanowire layer 120 is disposed on the main surface 111 of the substrate 110 and corresponds to the visible area VA and the peripheral area PA. In some embodiments, the metal nanowire layer 120 may include a matrix and a plurality of metal nanowires (not shown) distributed in the matrix, in which the matrix may include an acrylic material such as poly (methyl methacrylate), and the metal nanowires may include silver nanowires, gold nanowires, copper nanowires, nickel nanowires, or combinations thereof. The metal nanowire layer 120 defines an electrode portion E corresponding to the visible area VA. That is, the electrode portion E can at least constitute a touch electrode ET of the touch sensor 100. In the embodiment shown in FIG. 1A, the electrode portion E is an example of a single-layer electrode structure disposed on a single surface (side)

of the substrate 110, in which a plurality of the electrode portions E are arranged in a non-interlaced manner. For example, the electrode portions E may be strip-shaped electrodes extending along a first direction D1 and arranged at intervals along a second direction D2, in which the first direction D1 is substantially perpendicular to the second direction D2. In some embodiments, each electrode portion E may include a plurality of electrode lines L arranged and connected in parallel. For example, in the embodiment shown in FIG. 1A, each electrode portion E includes three electrode lines L arranged and connected in parallel. On the other hand, two adjacent electrode portions E are spaced apart by a first spacer region S1, and two adjacent electrode lines L are also spaced apart by the first spacer region S1.

The metal nanowire layer 120 defines a plurality of wiring portions T corresponding to the peripheral area PA, in which the wiring portions T respectively connects the corresponding electrode portions E, and two adjacent wiring portions T are spaced apart by a second spacer region S2. The silver layer 130 is disposed on the main surface 111 of the substrate 110 and stacked on and in contact with the wiring portions T. In some embodiments, the silver layer 130 is stacked on and in contact with an upper surface TS of the wiring portions T to form a plurality of peripheral traces PT of the touch sensor 100. In other words, the peripheral trace PT of the present disclosure has a double-layer structure, in which the metal nanowire layer 120 is disposed relatively close to the substrate 110, and the silver layer 130 is stacked on a surface of the metal nanowire layer 120 that faces away from the substrate 110. In some embodiments, the silver layer 130 may completely overlap the wiring portions T. That is, a vertical projection of the silver layer 130 on the substrate 110 may completely overlap a vertical projection of the wiring portions T on the substrate 110.

Based on the above configuration of the metal nanowire layer 120 and the silver layer 130, an electrical connection between the touch electrode ET and the peripheral trace PT can be directly formed by integrally forming the electrode portion E and the wiring portion T. Hence, there is no need for the design of an additional overlapping structure for realizing the electrical contact between the touch electrode ET and the peripheral trace PT, such that an area occupied by the overlapping structure corresponding to the peripheral area PA can be saved, and the overlapping tolerance will not be generated, which is beneficial to meet the narrow bezel requirement of the touch sensor 100. As a supplementary note, since the peripheral traces PT are designed to be insulated from each other and arranged at intervals, the silver layer 130 of the present disclosure is only disposed on the upper surface TS of the wiring portions T to overlap the wiring portions T, thereby ensuring that a sidewall 133 of the silver layer 130 and a sidewall 125 of the wiring portions T are aligned with each other. In other words, when the silver layer 130 is stacked on the wiring portions T, the silver layer 130 will not cover the sidewall 125 of the wiring portions T, so as to prevent the line width of the peripheral trace PT from increasing. When viewing from another perspective (e.g., from top or from side), the silver layer 130 and the wiring portions T have substantially the same pattern.

The method of the present disclosure for manufacturing the touch sensor 100 includes one mask etching process. That is, the peripheral area PA and the visible area VA are processed (patterned) through the same photoresist layer (mask). For the structure on the main surface 111 of the substrate 110 corresponding to the peripheral area PA, the wiring portion T is a double-layer structure formed by the silver layer 130 being stacked on the metal nanowire layer 120; for the structure on the main surface 111 of the substrate 110 corresponding to the visible area VA, the electrode portion E is a single-layer structure formed by the metal nanowire layer 120. Therefore, when the argon plasma treatment process is carried out to remove the residual resin left by the silver material layer (the material used for preparing the silver layer 130) in the double-layer structure that has undergone the etching process (for more details, please refer to the following paragraphs), the metal nanowire layer 120 corresponding to the visible area VA is directly processed by the argon plasma treatment process, resulting in the substrate 110 of the touch sensor 100 of the present disclosure having a structural feature after consideration and control of the overall process. In detail, two adjacent electrode portions E (or electrode lines L) are spaced apart by the first spacer region S1, and two adjacent wiring portions T are spaced apart by the second spacer region S2, in which a thickness T1 of the substrate 110 corresponding to the first spacer region S1 is smaller than a thickness T2 of the substrate 110 corresponding to the second spacer region S2. In other words, the substrate 110 may have a first surface recess R1 corresponding to the first spacer region S1 and a second surface recess (not shown in FIG. 1B) corresponding to the second spacer region S2, and a depth d1 of the first surface recess R1 is greater than a depth (not shown in FIG. 1B) of the second surface recess. Since the depth of the second surface recess in this embodiment is controlled to be 0 nm, the appearance of the second surface recess is not specifically shown in the figure.

Figure 2:
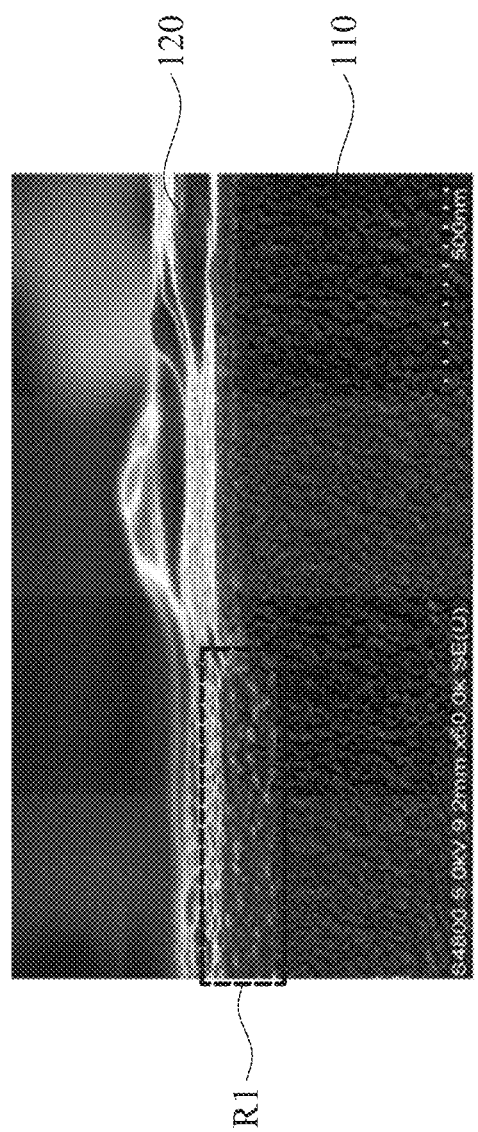
FIG. 2 is a focused ion beam scanning electron microscope (FIB-SEM) image of a touch sensor corresponding to a visible area according to some embodiments of the present disclosure.

It is worth noting that although the first surface recess R1 shown in FIG. 1B is illustrated as having a regular shape and a flat profile (e.g., flat sidewalls and bottom surfaces), the "recess" mentioned in the present disclosure actually refers to a concept of having a concave portion relative to a surface of a layer. Therefore, the sidewalls or bottom surfaces of the recess can actually have various possible shapes and profiles, for example, can be uneven and undulating. Reference is made to FIG. 2, which is a focused ion beam scanning electron microscope (FIB-SEM) image of a touch sensor 100 corresponding to a visible area VA according to some embodiments of the present disclosure. It can be seen from the dashed frame marked in FIG. 2 that the substrate 110 has a surface recess (i.e., the first surface recess R1) corresponding to the visible area VA, and the bottom surface of the recess is an uneven and undulating non-flat surface.

The structural feature on the substrate 110 of the touch sensor 100 of the present disclosure is further described below through the description of the manufacturing process.

Figure 3:
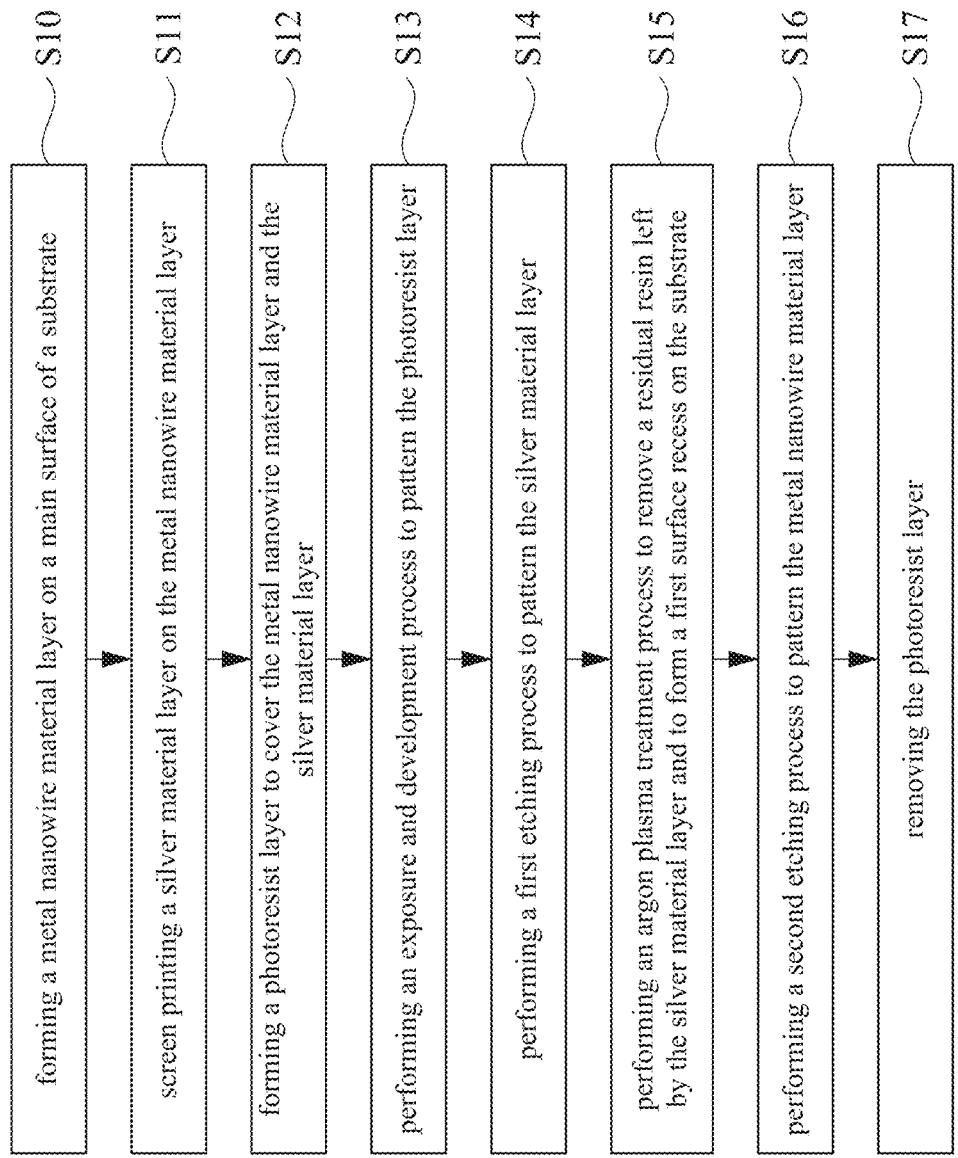
FIG. 3 is a flow chart illustrating a manufacturing method of a touch sensor according to some embodiments of the present disclosure.

Reference is made to FIG. 3, which illustrates a flow chart illustrating a manufacturing method of a touch sensor 100 according to some embodiments of the present disclosure. In the following description, the steps shown in FIG. 4A to FIG. 4H are taken as examples to describe the manufacturing method of a touch sensor 100, in which FIG. 4A to FIG. 4H are schematic cross-sectional views illustrating a manufacturing method of the touch sensor 100 of FIG. 1B in different steps. The manufacturing method of the touch sensor 100 includes step S10 to step S17, in which the step S10 to the step S17 may be performed in sequence.

Firstly, reference is made to FIG. 4A. In step S10, a metal nanowire material layer 220 is formed on a main surface 111 of a substrate 110, in which the metal nanowire material layer 220 corresponds to the visible area VA and the peripheral area PA. Specifically, a dispersion or slurry at least including metal nanowires and a matrix can be formed on the main surface 111 of the substrate 110 through processes such as screen printing, nozzle coating, or roller coating, and the dispersion or slurry is then cured or dried to form the metal nanowire material layer 220 disposed on the main surface 111 of the substrate 110. In some embodiments, a roll-to-roll process may be performed, such that the dispersion or slurry coated on the main surface 111 of the substrate 110 is supplied continuously. In some embodiments, pre-treatments may be performed on the main surface 111 of the substrate 110 before the metal nanowire material layer 220 is formed. For example, a surface modification process (e.g., surface hardening modification process) is performed or a functional coating layer (e.g., hard coating layer, adhesive layer, or resin layer) is additionally coated on the main surface 111 of the substrate 110 to enhance the adhesion between the substrate 110 and other layers. In some embodiments, for the touch sensor 100 with a surface resistance requirement of 30Ω per square, a thickness H1 of the metal nanowire material layer 220 can be designed to be greater than or equal to 40 nm and less than or equal to 50 nm. In detail, if the thickness H1 of the metal nanowire material layer 220 is greater than 50 nm, for example, a thickness of 60 nm, the optical properties (e.g., yellowness, which also refers to the b* value in the LAB color space) of the metal nanowire material layer 220 may have difficulty meeting the requirements, and if a thickness of 100 nm is adopted, the contact resistance between the metal nanowire material layer 220 and the silver material layer 230 subsequently disposed thereon (see FIG. 4B) is more likely to be high; if the thickness H1 of the metal nanowire material layer 220 is less than 40 nm, the anti-ultraviolet function of the touch sensor 100 may be insufficient.

Figure 5B:
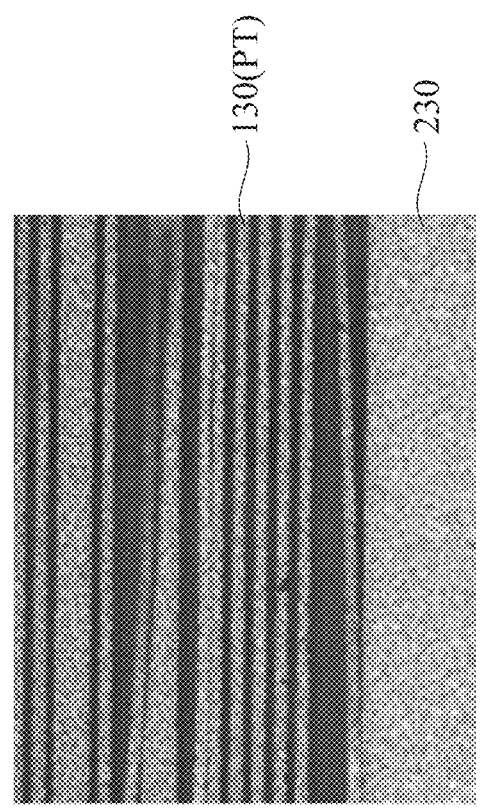
FIGS. 5A and 5B are optical microscope (OM) images of a silver layer in the peripheral trace formed by patterning the silver material layer of some comparative examples.
Figure 5A:
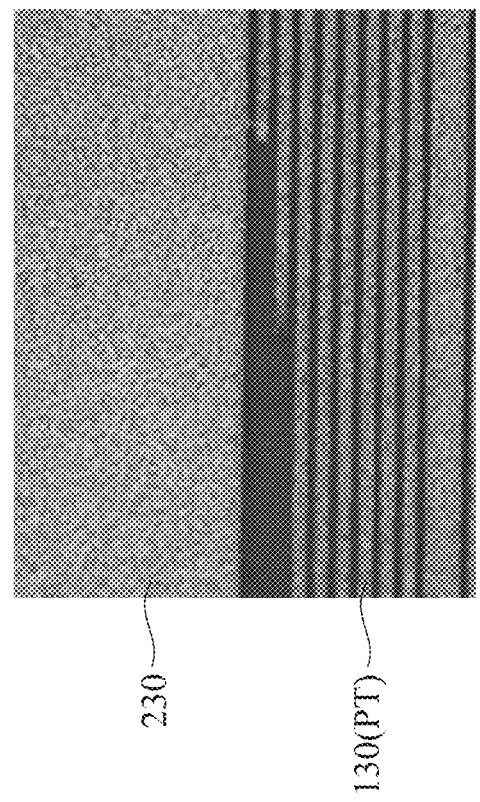

Then, reference is made to FIG. 4B. In step S11, a screen-printing process is performed to form a silver material layer 230 on the metal nanowire material layer 220, in which the silver material layer 230 corresponds to the peripheral area PA. Specifically, a silver paste material can be formed on the substrate 110 through a screen-printing process, in which the silver material layer 230 corresponds to the peripheral area PA to cover the metal nanowire material layer 220 corresponding to the peripheral area PA, and the silver paste material is then cured or dried to form the silver material layer 230. In some embodiments, a thickness H2 of the silver material layer 230 can be controlled in the range of greater than or equal to 400 nm and less than or equal to 600 nm. As such, it can reduce the possibility of the silver material layer 230 peeling off after the entire process due to the excessively small thickness H2. Also, it can prevent the silver material layer 230 from retaining too much residual resin after the subsequent etching process due to the excessively large thickness H2, which is not conducive to the complete removal of the residual resin, resulting in the excessively large thickness H2 of the silver material layer 230 causing a low etching precision of the metal nanowire material layer 220 when the metal nanowire material layer 220 is subsequently etched, such that the line width W1 and the line spacing D of the peripheral trace PT are unable to be reduced, leaving difficulties in realizing the narrow bezel requirement of the touch sensor 100. For the problem of the silver material layer 230 peeling off due to the excessively small thickness H2, please refer to FIG. 5A and FIG. 5B for specific evidence, in which FIGS. 5A and 5B are optical microscope (OM) images of a silver layer 130 in the peripheral trace PT formed by patterning the silver material layer 230 of some comparative examples. The comparative examples of FIGS. 5A and 5B are examples attempting to form the silver material layer 230 with a thickness H2 of about 300 nm. It can be seen from FIGS. 5A and 5B that the peripheral traces PT are not well and uniformly formed due to over-etching, peeling off, or poor etching, which may lead to open circuit or short circuit between two adjacent peripheral traces PT.

A person having ordinary skill in the art can understand that the factors affecting the thickness H2 of the silver material layer 230 formed by screen printing may include, for example, parameters such as screen mesh count, distance between the screen and the squeegee, squeegee pressure of screen printing, squeegee speed of screen printing, distance between the screen and surface to be printed, leveling property of the silver paste material (the leveling property of the silver paste material can be affected by the viscosity of silver paste material), etc. In some embodiments, the screen mesh count is 640 meshes, the distance between the screen and the squeegee is 3 mm, the squeegee speed of screen printing is 50 m/min, the distance between the screen and surface to be printed is 2.5 mm, and the viscosity of the silver paste material is greater than or equal to 1000 cp and less than or equal to 5000 cp. In this regard, the thickness H2 of the silver material layer 230 formed by screen printing of the present disclosure can be controlled within a range of greater than or equal to 400 nm and less than or equal to 600 nm.

Next, reference is made to FIG. 4C. In step S12, a photoresist layer 240 is formed on the main surface 111 of the substrate 110 to entirely cover the metal nanowire material layer 220 and the silver material layer 230. Then, reference is made to FIG. 4D. In step S13, an exposure and development process is performed, such that the photoresist layer 240 is patterned. In detail, the desired patterns to be formed on the metal nanowire material layer 220 and the silver material layer 230 are formed at once on a single photoresist layer 240 through a single exposure and development process, so as to reduce the steps and costs of the manufacturing process. In some embodiments, the photoresist layer 240 defines an electrode pattern EP corresponding to the visible area VA and defines a wiring pattern TP corresponding to the peripheral area PA. The electrode pattern EP and the wiring pattern TP of the patterned photoresist layer 240 can be transferred to the metal nanowire material layer 220 and the silver material layer 230 in the subsequent etching process, so as to form the metal nanowire layer 120 including the electrode portion E and the wiring portion T as well as the silver layer 130 stacked on and in contact with the wiring portion T (for specific configuration, please refer to FIG. 1B) after the subsequent removal of the photoresist layer 240.

Subsequently, reference is made to FIG. 4E. In step S14, a first etching process is performed, such that the silver material layer 230 corresponding to the peripheral area PA is patterned to be provided with a desired pattern. In detail, the silver material layer 230 can be patterned through the wiring pattern TP to be provided with a pattern that is conformal with the pattern of the wiring pattern TP. In some embodiments, the main components of the etching solution for etching the silver material layer 230 may include, for example, ferric nitrate.

It is worth mentioning that, as shown in FIG. 4E, after the silver material layer 230 is etched, there is usually a residue 250, such as resin, remaining in the etching region S, and a thickness H3 of the residue 250 is related to the initial thickness H2 of the silver material layer 230 (see FIG. 4B). In general, the thickness H3 of the residue 250 is about 20% of the initial thickness H2 of the silver material layer 230. Therefore, as mentioned above, the thickness H2 of the silver material layer 230 is controlled to be less than or equal to 600 nm to prevent the silver material layer 230 from leaving too much residual resin after the subsequent etching process due to the excessively large thickness H2, which is not conducive to the complete removal of the residual resin. Hence, the etching precision of the metal nanowire material layer 220 will not be affected.

Next, in order to remove the residue 250 to avoid affecting the etching of the metal nanowire material layer 220, in some embodiments, reference is made to FIG. 4F for step S15. In step S15, an argon plasma treatment process is performed to further process the patterned silver material layer 230 through the wiring pattern TP. More specifically, the argon plasma treatment process is performed on the residue 250 (see FIG. 4E) in the etching region S of the peripheral area PA, such that the residue 250 left by the silver material layer 230 that has undergone the first etching process is completely removed. Since the argon plasma treatment process is non-selective, all surfaces exposed to the treatment environment will be physically removed. As a result, the residue 250 can be completely removed. In some embodiments, the argon plasma treatment process is performed on the silver material layer 230 for about 4.5 minutes, in which the argon plasma treatment process is carried out by a plasma with a minimum vacuum degree of about 20 mtorr, a working vacuum degree of about 200 mtorr, a power of about 8 kW, an argon flow rate of 1000 sccm (standard cubic centimeter per minute), an oxygen flow rate of 2000 sccm, and a tetrafluoromethane flow rate of 900 sccm.

In step S15, since the argon plasma treatment process is performed on the entire surface, in addition to removing the residue 250 corresponding to the peripheral area PA, a portion of the metal nanowire material layer 220 corresponding to the visible area VA is also removed through the electrode pattern EP, such that the electrode portions E spaced apart by the first spacer regions S1 are formed from the metal nanowire material layer 220. In addition, since the thickness H3 of the residue 250 (e.g., about 80 nm to 120 nm) is greater than the thickness H1 of the metal nanowire material layer 220 (e.g., about 40 nm to 50 nm), a portion of the substrate 110 corresponding to the visible area VA is further removed under the premise that the residue 250 corresponding to the peripheral area PA is to be completely removed, resulting in the thickness T1 of the substrate 110 corresponding to the first spacer region S1 being reduced. That is, the first surface recess R1 corresponding to the first spacer region S1 (i.e., the structural feature on the substrate 110 of the present disclosure) will be formed by the argon plasma treatment process. For example, when the thickness H3 of the residue 250 is the thinnest thickness (about 80 nm), and the thickness H1 of the metal nanowire material layer 220 is the thickest thickness (about 50 nm), a first surface recess R1 with a depth d1 of at least 30 nm is formed on the substrate 110 under the premise that the residue 250 is to be completely removed. In addition, as shown in FIG. 4F, in some embodiments, in order to completely remove the residue 250 left by the silver material layer 230 during step S15, the argon plasma treatment process is usually controlled to carry out an overcritical treatment, resulting in the matrix of a portion of the metal nanowire material layer 220 corresponding to the peripheral area PA being removed. Furthermore, in order to prevent the matrix of the metal nanowire material layer 220 from being left in the etching region S of the peripheral area PA, the overcritical treatment can further control the argon plasma treatment process to completely remove the matrix of the metal nanowire material layer 220 corresponding to the peripheral area PA (in which FIG. 4G and FIG. 4H are examples of such an aspect).

However, in the present disclosure, it is still necessary to consider the depth d1 of the first surface recess R1 formed in the visible area VA when controlling the overcritical treatment, so as to avoid the problem of visibility caused by the excessively deep recess. As a supplementary note, all that is removed by the argon plasma treatment process is the matrix in the metal nanowire material layer 220. Therefore, after the argon plasma treatment process, it can be seen that the metal nanowires 222 in the metal nanowire material layer 220 are exposed in the visible area VA and the peripheral area PA.

Figure 6:
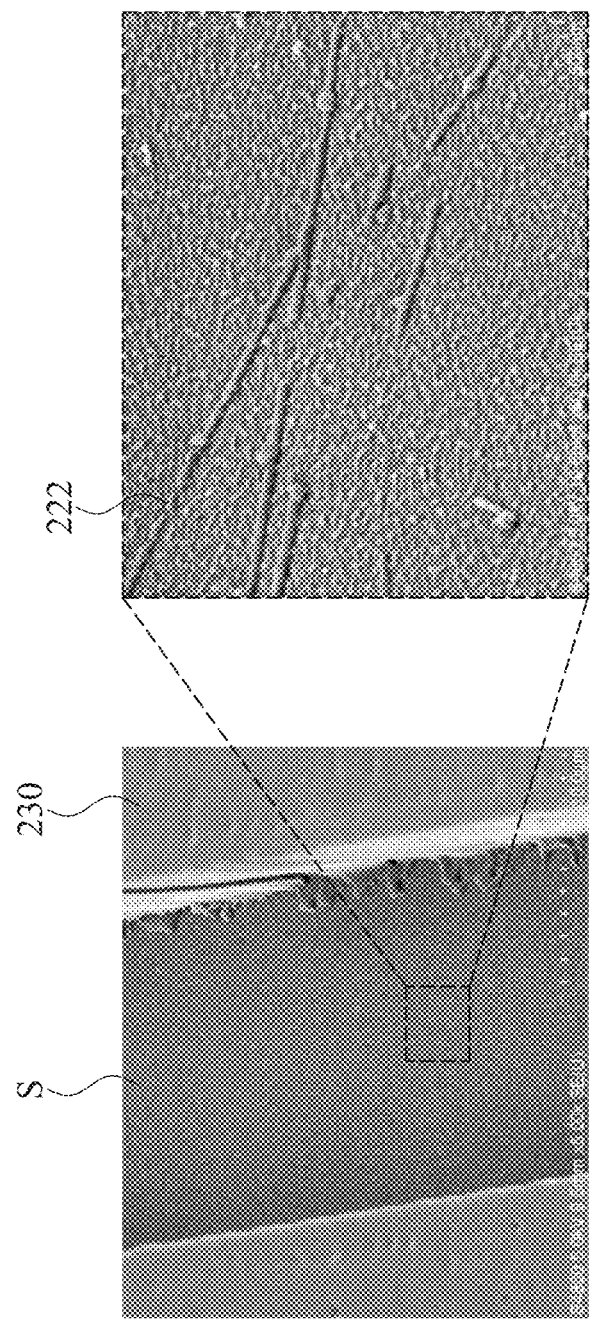
FIG. 6 is a scanning electron microscope (SEM) image of an etching region after the silver material layer is subjected to an argon plasma treatment process according to some embodiments of the present disclosure.

More specifically, reference is made to FIG. 6, which is a scanning electron microscope (SEM) image of an etching region S after the silver material layer 230 is subjected to an argon plasma treatment process according to some embodiments of the present disclosure. It can be seen from FIG. 6 that the metal nanowires 222 are exposed from the etching region S after the argon plasma treatment process.

As a supplementary note, the argon plasma treatment process mentioned in the above step S15 can be selectively adjusted according to the requirements of the etching precision in the actual manufacturing process. For example, a single argon plasma treatment process can remove the residue 250 with a thickness H3 of about 100 nm. Hence, the residue 250 with a thickness H3 exceeding 100 nm may require at least two argon plasma treatment processes to be completely removed. Furthermore, in some embodiments, a chemical cleaning process can be performed before the argon plasma treatment process, so as to preliminarily remove a portion of the residue 250. However, since the chemical cleaning process removes the residue 250 through chemical reaction, the residue 250 cannot be removed after the chemical equilibrium is reached. Therefore, the purpose of the chemical cleaning process is to reduce the thickness H3 of the residue 250 to about 100 nm, such that the residue 250 can be completely removed by simply performing a single argon plasma treatment process. In some embodiments, during the chemical cleaning process, a surface treatment is performed on the silver material layer 230 by using a chemical cleaning agent that can remove the resin for about 40 seconds at an ambient temperature of about 45° C. with a showerhead pressure of about 0.2 MPa.

Next, reference is made to FIG. 4G. In step S16, a second etching process is performed, such that the metal nanowire material layer 220 corresponding to the peripheral area PA and the visible area VA is patterned. More specifically, the metal nanowires 222 in the metal nanowire material layer 220 are removed by the second etching process, and the expected patterns are formed by the second etching process. In addition, since the photoresist used in the second etching process and the photoresist used in the first etching process are the same photoresist layer 240, the pattern formed by the second etching process on the metal nanowire material layer 220 corresponding to the peripheral area PA will be the same as the pattern of the patterned silver material layer 230 corresponding to the peripheral area PA, and other expected patterns (e.g., the electrode pattern EP) are formed by the second etching process on the metal nanowire material layer 220 corresponding to the visible area VA. Overall, the electrode pattern EP and the wiring pattern TP of the photoresist layer 240 may be transferred to the metal nanowire material layer 220 during the second etching process, such that the metal nanowire material layer 220 is patterned to be provided with an electrode portion E corresponding to the visible area VA and a wiring portion T corresponding to the peripheral area PA. In some embodiments, the main components of the etching solution for etching the metal nanowire material layer 220 may include, for example, ferric nitrate. It is noted that the main components of the etching solution for etching the metal nanowire material layer 220 (silver nanowire material layer) and the main components of the aforementioned etching solution for etching the silver material layer 230 are both ferric nitrate; however, the minor components can be adjusted according to the actual process to control the etching conditions of the metal nanowire material layer 220 and the silver material layer 230 to be in a differentiated manner.

Reference is made to FIG. 4H. In step S17, the photoresist layer 240 is removed. For the visible area VA, after the photoresist layer 240 is removed, it can be seen that a plurality of the electrode portions E formed by the patterned metal nanowire material layer 220 (i.e., the metal nanowire layer 120) are arranged at intervals, in which two adjacent electrode portions E are spaced apart by the first spacer region S1. For the peripheral area PA, in the embodiment of FIG. 4H, after the photoresist layer 240 is removed, it can be seen that a plurality of the wiring portions T formed by the patterned metal nanowire material layer 220 (i.e., the metal nanowire layer 120) that are arranged at intervals and the silver layer 130 that is stacked on the wiring portions T formed by the patterned silver material layer 230 are formed, in which two adjacent wiring portions T are spaced apart by the second spacer region S2. Based on the aforementioned one mask etching process combined with the argon plasma treatment process to remove the residue 250 left by the silver material layer 230 corresponding to the peripheral area PA, the thickness T1 of the substrate 110 corresponding to the first spacer region S1 is smaller than the thickness T2 of the substrate 110 corresponding to the second spacer region S2. In other words, the substrate 110 may have a first surface recess R1 corresponding to the first spacer region S1 and a second surface recess corresponding to the second spacer region S2, and the depth d1 of the first surface recess R1 is greater than the depth of the second surface recess. However, the depth of the second surface recess in this embodiment is controlled to be 0 nm. That is, the substrate 110 corresponding to the peripheral area PA has a main surface 111 that is flat and non-recessed, resulting in the substrate 110 corresponding to the peripheral area PA remaining intact.

To sum up the above steps S13 to S17, the argon plasma treatment process is performed between the two etching processes (the first etching process and the second etching process) to improve the etching precision in the present disclosure, and the chemical cleaning process can also be selectively incorporated. The overall process is referred to as "development," "first etching (of the silver material layer 230)," "chemical cleaning," "plasma treatment," "second etching (of the metal nanowire material layer 220)," and "stripping," which is further shortened as "DECEPS process."

Reference is made back to FIG. 1A and FIG. 1B. In some embodiments, the depth d1 of the first surface recess R1 may be greater than or equal to 30 nm and less than or equal to 200 nm. As mentioned above, since the method of the present disclosure for manufacturing the touch sensor 100 includes one mask etching process combined with an argon plasma treatment process to completely remove the residue 250 (e.g., resin) left by the silver material layer 230 that has undergone the etching process to improve the etching precision of the subsequent etching process for meeting the narrow bezel requirement of the touch sensor 100, the first surface recess R1 is formed on the substrate 110 in the visible area VA and corresponding to the first spacer region S1. Also, in some embodiments, in order to completely remove the resin left by the silver material layer 230 corresponding to the peripheral area PA, the depth d1 of the first surface recess R1 is at least 30 nm. In addition, by controlling the depth d1 of the first surface recess R1 to be less than or equal to 200 nm, the possibility of affecting the optical uniformity of the visible area VA due to the excessively large depth of the first spacer region S1 can be reduced (e.g., the visibility of the electrode portion E can be reduced by controlling the depth d1 of the first surface recess R1 to be less than or equal to 200 nm).

The influence of the depth d1 of the first surface recess R1 on the optical uniformity of the visible area VA is verified in more detail below with reference to the semi-manufactured product of the touch sensor 100 of each embodiment. Reference is made to Table 1, which lists the optical test results of the visible area VA of the semi-manufactured product of the touch sensor 100 when the substrate 110 corresponding to the visible area VA has first surface recesses R1 of different depths d1. In Table 1, the stack structure of the semi-manufactured product of each touch sensor 100 includes a substrate 110 (including a polyethylene terephthalate (PET) substrate and a hard coating layer disposed on the PET substrate) and a metal nanowire layer 120 disposed on the substrate 110, in which the metal nanowire layer 120 includes a plurality of electrode portions E arranged at intervals, and the thickness H of the metal nanowire layer 120 is 40 nm. In addition, the optical test results shown in Table 1 include the haze of the visible area VA of the semi-manufactured product of the touch sensor 100 and the visibility of the electrode portion E in the visible area VA of the semi-manufactured product of the touch sensor 100, in which the visibility of the electrode portion E is observed with naked eye under specific detection conditions (i.e., irradiating the semi-manufactured product of the touch sensor 100 with light with an illuminance of 1000 lux to 1200 lux, in which the observation distance is 30 cm and the observation time is 15 seconds) and scored based on the standard product.

TABLE 1

| Depth of First Surface Recess R1 (nm) | Speed of Argon Plasma (m/min) | Cycles of Argon Plasma Treatment Process (times) | Optical Test Results | |
|---|---|---|---|---|
| | | | Haze | Visibility of Electrode Portion |
| 0 | N/A | N/A | 1.14 | 5 points |
| 76 | 1.00 | 1 | 1.15 | 5 points |
| 124 | 1.00 | 2 | 1.30 | 4 points |
| 168 | 0.66 | 2 | 1.47 | 3 points |
| 219 | 0.50 | 2 | 1.62 | 2 points |
| 266 | 0.33 | 2 | 1.78 | 1 point |
| 331 | 0.25 | 2 | 1.92 | 0 point |

Note:
0 point → visible; 1 point → moderately obvious; 2 points → moderate; 3 points → moderately inconspicuous; 4 points → slightly visible; 5 points → faintly visible (almost invisible); the criterion for passing the visibility test is 3 points.

As can be seen from the optical test results in Table 1, when the depth d1 of the first surface recess R1 on the substrate 110 is less than or equal to 200 nm, there is only a little influence on the visibility of the electrode portion E in the visible area VA. That is, the electrode portion E has less visibility problems, and the haze of the visible area VA is relatively small.

In some embodiments, for the visible area VA, a sidewall for defining a side boundary of the first spacer region S1 is a sidewall 123 of the electrode portion E (electrode line L)

of the metal nanowire layer 120, and a sidewall for defining a side boundary of the first surface recess R1 is a sidewall 113 of the substrate 110, in which the sidewall 123 and the sidewall 113 are continuously extended, and preferably in a state of aligning; for the peripheral area PA, a sidewall for defining a side boundary of the second spacer region S2 is a sidewall 125 of the wiring portion T of the metal nanowire layer 120, in which the sidewall 125 and the sidewall 133 of the silver layer 130 are aligned with each other. It is worth noting that in the present disclosure, for the peripheral area PA, the material layer for forming the metal nanowire layer 120 is firstly formed corresponding to an entire surface of the peripheral area PA, then the material layer for forming the silver layer 130 is formed corresponding to an entire surface of the peripheral area PA, and then the one mask etching process is performed to pattern the above-mentioned material layers to further form the peripheral trace PT. Therefore, there is no need to reserve overlapping tolerance for an overlapping structure between the silver layer 130 and the metal nanowire layer 120 corresponding to the peripheral area PA, and the silver layer 130 and the metal nanowire layer 120 in each peripheral trace PT can be precisely aligned, which is beneficial to meet the narrow bezel requirement of the touch sensor 100.

On the other hand, as mentioned above, the substrate 110 of the present disclosure may include a single substrate (base layer) and at least one functional coating layer disposed on the base layer. In this regard, in some embodiments, when the substrate 110 includes the base layer and the functional coating layer disposed on the base layer, a bottom surface for defining a bottom boundary of the first surface recess R1 may be a surface of the base layer. That is, the depth d1 of the first surface recess R1 is relatively large, and the first surface recess R1 is recessed into the base layer. In some other embodiments, a bottom surface for defining a bottom boundary of the first surface recess R1 may be a surface of the functional coating layer. That is, the depth d1 of the first surface recess R1 is relatively small, and the first surface recess R1 is only recessed into the functional coating layer.

In addition, also due to the one mask etching process that combined with the argon plasma treatment process to completely remove the resin left by the silver material layer 230 that has undergone the etching process, the etching precision of the etching process can be improved, such that the line width W1 of each of the peripheral traces PT arranged in parallel corresponding to the peripheral area PA can be controlled to be greater than or equal to 6 μn and less than or equal to 10 μm, and the line spacing D of two adjacent peripheral traces PT can be controlled to be greater than or equal to 6 μn and less than or equal to 10 μm. The line width W1 and the line spacing D of the peripheral trace PT have a certain influence on the size of the peripheral area PA (e.g., the width W of the peripheral area PA) of the touch sensor 100, and since the size of the peripheral area PA further affects the bezel size of the terminal product, the touch sensor 100 of the present disclosure can meet the requirements of the electrical specifications as well as the demand for narrow bezel products.

In some embodiments, the touch sensor 100 may further include a protective layer 140 disposed on the main surface 111 of the substrate 110 and entirely covering the metal nanowire layer 120 and the silver layer 130. The protective layer 140 may include insulating resins, organic materials, or inorganic materials. For example, the protective layer 140 may include materials such as polyethylene, polypropylene, polycarbonate, polyvinyl butyral, polystyrene sulfonic acid, acrylonitrile-butadiene-styrene copolymer, poly(3,4-ethylenedioxythiophene), ceramic, or combinations thereof.

Figure 7:
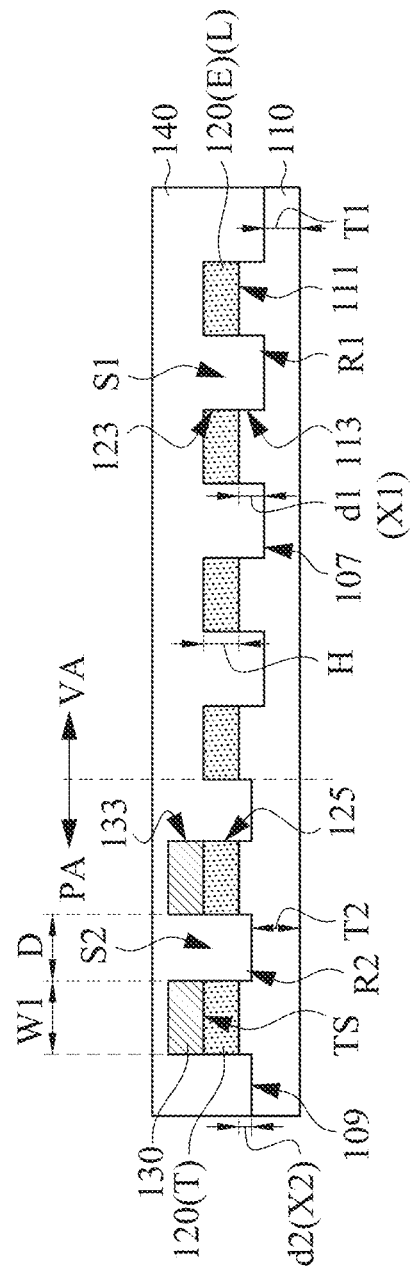
FIG. 7 is a schematic cross-sectional view of a touch sensor according to some other embodiments of the present disclosure, in which the cross-sectional position of FIG. 7 corresponds to the position taken along the line A-A' shown in FIG. 1.

Reference is made to FIG. 7, which is a schematic cross-sectional view of a touch sensor 100a according to some other embodiments of the present disclosure, in which the cross-sectional position of FIG. 7 corresponds to the position taken along the line A-A' shown in FIG. 1. At least one difference between the touch sensor 100a shown in FIG. 7 and the touch sensor 100 shown in FIG. 1B is that in the touch sensor 100a of FIG. 7, the substrate 110 corresponding to the peripheral area PA has a second surface recess R2 corresponding to the second spacer region S2. The formation of the second surface recess R2 can be understood from the aforementioned description of FIG. 4F. In some embodiments, when the overcritical treatment is to control the argon plasma treatment process to completely remove the matrix of the metal nanowire material layer 220 corresponding to the peripheral area PA, since the depth processed by a single argon plasma treatment process is fixed, it may further cause the substrate 110 that corresponds to the second spacer region S2 in the peripheral region PA to be thinned and form the second surface recess R2 thereon. However, this does not affect the structural feature of the present disclosure. Since the residue 250 left by the silver material layer 230 covers the substrate 110 in the etching region S of the peripheral area PA, and no residue 250 covers the substrate 110 in the visible area VA, under the same duration or number of argon plasma treatment processes, the thinning of the substrate 110 in the etching region S corresponding to the peripheral area PA is less obvious than the thinning of the substrate 110 in the etching region S corresponding to the visible area VA. In other words, the thinning degree of the second surface recess R2 is smaller than the thinning degree of the first surface recess R1. That is, the depth d2 of the second surface recess R2 is smaller than the depth d1 of the first surface recess R1. In other words, the thickness T2 of the substrate 110 corresponding to the second spacer region S2 is greater than the thickness T1 of the substrate 110 corresponding to the first spacer region S1.

A method for measuring the depth d1 of the first surface recess R1 on the substrate 110 is further supplemented. Reference is made to FIG. 7 and FIG. 8, in which FIG. 8 is a schematic diagram illustrating the measurement of the depths d1, d2 of the first and second surface recess R1, R2 according to some embodiments of the present disclosure. A rectangular touch sensor 100 is illustrated in FIG. 8 as an example, and the electrode portion E of the touch sensor 100 in FIG. 8 are strip-shaped electrodes extending along the first direction D1 and arranged at intervals along the second direction D2. The depth d1 of the first surface recess R1 can be obtained by performing a specific measurement on the substrate 110 corresponding to the visible area VA, in which the measurement method may include the following steps. Step S1: Divide an extension length L2 of the substrate 110 corresponding to the visible area VA of the touch sensor 100a along the second direction D2 into five sections with equal length by four points O1-O4. Step S2: Take point O1 as a center point (axis) of the observation section of the FIB-SEM, and then measure a vertical distance X1 between a bottom surface 107 of the surface recess and a main surface 111 of the substrate 110 (please refer to FIG. 7 for clear understanding) to obtain the depth of the surface recess in the observation section. Step S3: Respectively take points O2-O4 as the center points (axes) of the observation section of the same FIB-SEM, and then repeat step S2 to respectively obtain the depths of the surface recesses in the observation sections. Step S5: Calculate the average value of the depths of the surface recesses in the observation sections (4 numbers in total) obtained in the previous steps, and take the average value as the depth d1 of the first surface recesses R1. After steps S1 to S4 are performed, the depth d1 of the first surface recesses R1 can be obtained. It should be understood that in FIG. 7, although the vertical distance X1 between the bottom surface 107 of the surface recess and the main surface 111 of the substrate 110 is directly marked as the depth d1 of the first surface recesses R1, and the depth d1 of the first surface recesses R1 is in fact the average value of the depths of the surface recesses obtained in the observation sections.

On the other hand, regarding a method for measuring the depth d2 of the second surface recess R2 on the substrate 110, the same measurement method as described above can be applied to the peripheral area PA on a single side of the touch sensor 100a by four points (i.e., divide an extension length L2 of the substrate 110 corresponding to the peripheral area PA on single side of the touch sensor 100a along the second direction D2 into five sections with equal length by four points), or the same measurement method as described above can be applied to the peripheral area PA on two sides (e.g. left and right sides) of the touch sensor 100a by four points (i.e., two points on the left side and two points on right side, as the points O1'~O2' shown in FIG. 8). As such, a vertical distance X2 between a bottom surface 109 of the surface recess and a main surface 111 of the substrate 110 (please refer to FIG. 7 for clear understanding) can be obtained, and the average value of multiple vertical distances X2 can be calculated.

According to the aforementioned embodiments of the present disclosure, the design of the touch sensor of the present disclosure helps to form peripheral traces with small line width and line spacing without degrading the optical effect of the touch sensor. In addition, by integrally forming the electrode portion and the wiring portion to directly form an electrical connection between the touch electrode and the peripheral trace, there is no need to design an additional overlapping structure for the touch sensor. Hence, an area occupied by the overlapping structure corresponding to the peripheral area can be saved, and the overlapping tolerance will not be generated, which is beneficial to realize the narrow bezel design of the touch sensor. Furthermore, based on the stacked-structure design of the touch sensor of the present disclosure, during the manufacturing process of the touch sensor, the touch electrode and the peripheral trace can be formed at once through a single exposure and development process (i.e., only a single mask (photoresist) is used), and the argon plasma treatment process is performed in combination to remove the residual resin left by the silver material layer after the etching process, thereby reducing the steps and costs of the manufacturing process and improving the etching precision to form the peripheral traces with small line width and line spacing.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A touch sensor having a visible area and a peripheral area adjacent to at least one side of the visible area, the touch sensor comprising:
   a substrate comprising a main surface and a secondary surface opposite to the main surface;
   a metal nanowire layer disposed on the main surface of the substrate on a side of the main surface facing away from the secondary surface, wherein the metal nanowire layer defines a plurality of electrode portions corresponding to the visible area and defines a plurality of wiring portions corresponding to the peripheral area, the electrode portions are arranged at intervals, the wiring portions are respectively connected to the electrode portions and arranged at intervals, two adjacent electrode portions of the electrode portions are spaced apart by a first spacer region, and two adjacent wiring portions of the wiring portions are spaced apart by a second spacer region; and
   a silver layer disposed on the wiring portions and being in contact with the wiring portions;
   wherein a thickness of the substrate that corresponds to the first spacer region is smaller than a thickness of the substrate that corresponds to the second spacer region and each thickness is measured from the main surface to the secondary surface in a direction perpendicular to the main surface.

2. The touch sensor of claim 1, wherein the substrate has a first surface recess corresponding to the first spacer region and a second surface recess corresponding to the second spacer region, and a depth of the first surface recess is greater than or equal to 30 nm and less than or equal to 200 nm.

3. The touch sensor of claim 1, wherein the substrate has a first surface recess corresponding to the first spacer region, a depth of the first surface recess is greater than or equal to 30 nm and less than or equal to 200 nm, and the main surface of the substrate that corresponds to the peripheral area is substantially flat.

4. The touch sensor of claim 2, wherein the substrate comprises a base layer and a functional coating layer disposed on the base layer, and a bottom surface for defining a bottom boundary of the first surface recess is a surface of the base layer.

5. The touch sensor of claim 2, wherein the substrate comprises a base layer and a functional coating layer disposed on the base layer, and a bottom surface for defining a bottom boundary of the first surface recess is a surface of the functional coating layer.

6. The touch sensor of claim 1, wherein the silver layer is in contact with an upper surface of the wiring portions to form a plurality of peripheral traces of the touch sensor.

7. The touch sensor of claim 6, wherein a line width of each of the peripheral traces is greater than or equal to 6 μm and less than or equal to 10 μm, and a line spacing of two adjacent peripheral traces of the peripheral traces is greater than or equal to 6 μm and less than or equal to 10 μm.

8. The touch sensor of claim 1, wherein the metal nanowire layer comprises a matrix and a plurality of metal nanowires distributed in the matrix.

9. A manufacturing method of a touch sensor having a visible area and a peripheral area adjacent to at least one side of the visible area, the manufacturing method comprising:
   forming a metal nanowire material layer on a main surface of a substrate, wherein the metal nanowire material layer corresponds to the visible area and the peripheral area;

screen printing a silver material layer on the metal nanowire material layer and corresponding to the peripheral area;

forming a photoresist layer to cover the metal nanowire material layer and the silver material layer;

performing an exposure and development process to pattern the photoresist layer, wherein the photoresist layer, which is patterned, defines an electrode pattern corresponding to the visible area and defines a wiring pattern corresponding to the peripheral area;

performing a first etching process to pattern the silver material layer through the wiring pattern;

performing an argon plasma treatment process to remove a residual resin corresponding to the peripheral area through the wiring pattern, wherein the residual resin is left by the silver material layer that has undergone the first etching process, and to remove at least a portion of the metal nanowire material layer and a portion of the substrate corresponding to the visible area through the electrode pattern such that a first surface recess is formed on the substrate;

performing a second etching process to pattern the metal nanowire material layer through the wiring pattern and the electrode pattern; and removing the photoresist layer.

10. The manufacturing method of the touch sensor of claim 9, further comprising:

performing a chemical cleaning process after the first etching process and before the argon plasma treatment process, wherein the chemical cleaning process removes a portion of the residual resin corresponding to the peripheral area through the wiring pattern, and the residual resin is left by the silver material layer that has undergone the first etching process.

11. The manufacturing method of the touch sensor of claim 9, wherein the metal nanowire material layer comprises a matrix and a plurality of metal nanowires distributed in the matrix.

12. The manufacturing method of the touch sensor of claim 11, wherein the argon plasma treatment process removes the matrix of the metal nanowire material layer.

13. The manufacturing method of the touch sensor of claim 11, wherein the argon plasma treatment process further comprises:

removing at least a portion of the matrix of the metal nanowire material layer corresponding to the peripheral area through the wiring pattern.

14. The manufacturing method of the touch sensor of claim 13, wherein the argon plasma treatment process further comprises:

removing a portion of the substrate corresponding to the peripheral area through the wiring pattern, such that a second surface recess is formed on the substrate.

* * * * *